June 9, 1959

A. LESTI 2,890,275

MAGNETIC RECORDING USING ACOUSTIC DELAY LINE

Filed Oct. 25, 1954

INVENTOR
ARNOLD LESTI

BY

Wayne M. Hart
ATTORNEY 2,890,275

MAGNETIC RECORDING USING ACOUSTIC DELAY LINE

Arnold Lesti, Arlington County, Va., assignor to ACF Industries, Incorporated, New York, N.Y., a corporation of New Jersey Application October 25, 1954, Serial No. 464,482

13 Claims. (Cl. 178—6.6)

The invention is useful in connection with many kinds of high speed recording and playback and may be used in many environments, such as in data processing equipment, sound signal recording and video signal recording. Accordingly, the recording medium may be selected from any of the known and proven types such as a drum or tape, the former being suggested for computers, coders and the like, and the latter being preferred when the principles of the invention are practiced in recording television video signals. A considerable amount of serious effort has been directed toward finding a method and means for recording on a magnetic medium television video signals so that they may be subsequently played back through a television receiver. Inasmuch as the present invention provides a solution for this problem, the following description will reference video signal recording and playback on a paramagnetic tape. However, it is to be understood that the invention is not limited to such use, but that it is to find its field of application extended to all types of high speed recording and playback.

As far as can be determined the present attempts to record video signals on a magnetic medium have followed the teachings of Valdemar Poulsen as set forth in Patent No. 661,619 wherein he indicates that a paramagnetic ribbon may be moved past an electro-magnet connected with an electric transmitter and the ribbon is magnetically excited along its length in exact correspondence with the signals, messages, or speech delivered to the transmitter. An object of this invention is to teach a new technique of magnetic recording high bandwidth signals which deviates from the customary production of a fluctuating magnetic field adjacent to a paramagnetic body in that a constant strength but intermittent magnetic field is very rapidly produced near the tape and with each of the intermittent fields, reluctance patterns are formed between the tape and the origin of the field. This permits the use of a supersonic acoustic delay line driven on one end by the signal to be recorded, as a television composite video signal, whereby the latter is directly responsible for the particular configuration of the reluctance pattern. By synchronizing the formation of constant strength magnetic fields with the signal application rate to the delay line for forming the acoustic waves, individual tracks on the tape may be formed in a definite pattern.

A further object of the invention is to provide a new playback apparatus and technique which consists in sending an acoustic pulse down a delay line located adjacent to the magnetic tape on which the tracks are present. The acoustic pulse, in its carrier medium such as a magnetizable material rod, forms a reluctance pattern which varies in accordance with the particular configuration of the pulse. Inasmuch as this reluctance pattern is located between the magnetic tape and the pick up trandsducer, the induced voltage obtained in playback will vary in accordance with the variations in magnetic intensity on the tape.

As a preferred construction the delay line extends transversely across the tape with its longitudinal axis normal to the direction of movement of the tape. As a result, the magnetic tracks applied to the tape extend across the tape and each is handled in sequence for both application of the tracks and playback. In playback, as the tape moves at right angles to the direction of motion of the acoustic wave, repeated tracks are brought in proximity to the acoustic delay line so that playback of every track is obtained in proper order.

A more specific object of the invention is to provide a refined playback apparatus wherein there is a head having two cores, one with the supersonic pulse on a delay line as described previously and the other having a delay line, but without a supersonic pulse on it. In this way the respective outputs obtained from simultaneous use of both of the cores preferably takes the form of subtracting the respective outputs to cancel the unwanted signals but to pass solely the signal which represents the magnetic variations in each track on the tape.

Other objects and features of importance will become apparent in following the description of the illustrated forms of the invention.

*Recording*

Figure 1:
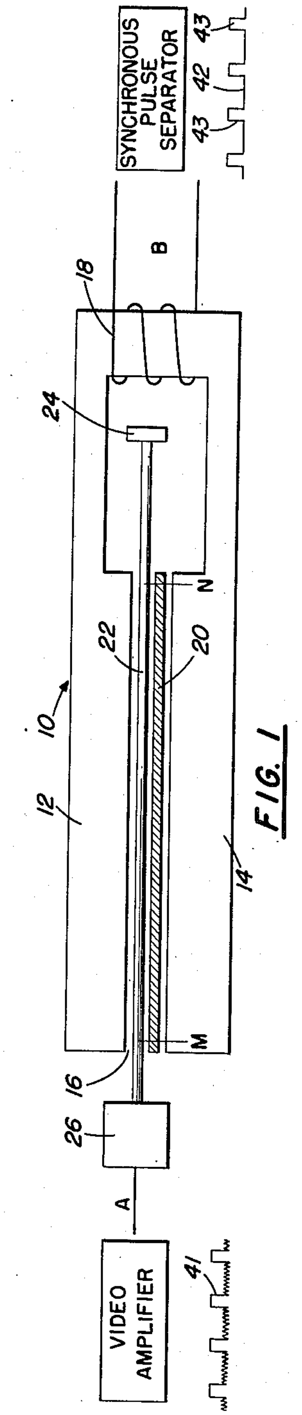
Fig. 1 is largely a schematic view of a typical recording and playback head employing the principles of the invention.

As previously indicated, the invention may be practiced with one or more of the three accepted classifications of recordings. Perpendicular recording is quite common in data processing equipment such as computers, counters, or other devices having magnetic stores, while longitudinal recording is by far the most common. In Fig. 1 recording head 10 is shown as generally C-shaped including pole members 12 and 14 connected together at one end whereon excitation coil 18 is disposed. Pole members 12 and 14 are spaced a minimum amount to form recording gap 16, the size of this gap being exaggerated in the drawing in order to avoid crowding of the lines. The gap 16 is made just wide enough to accommodate satisfactorily the paramagnetic recording medium, for example, tape 20, together with the acoustic delay line 22. In other words, high flux resolution is desired here just as it is desired ordinarily in sound recording.

Figures 5, 6, 7:
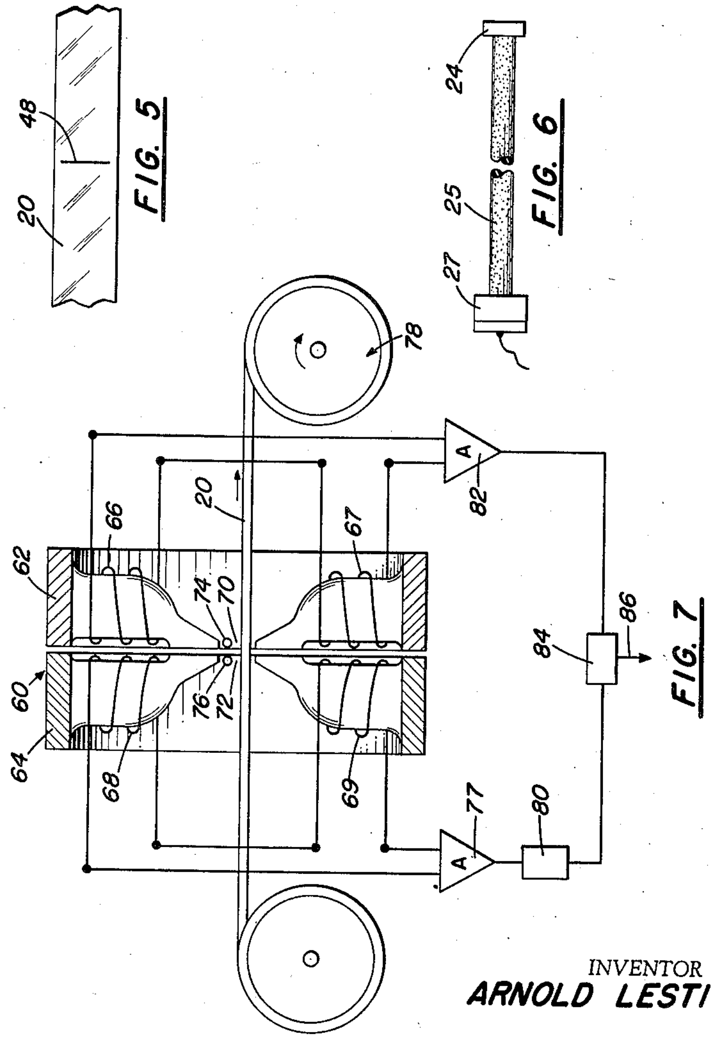
Fig. 5 is a fragmentary plan view of the recording tape showing a single track transversely thereon.
Fig. 6 is an alternative form of one of the many acoustic delay lines which may be used herein.
Fig. 7 is a largely schematic view of a playback apparatus forming a part of the invention.

Acoustic delay line 22 is made of magnetic material such as nickel, and is driven by a driver 26. This driver may be of the magneto-striction type or, as an alternative, it may be of the crystal type, such as a synthetic or quartz crystal. At the opposite end of the delay line 22 there is a wave energy absorber 24 to prevent unwanted wave reflections. Even though the acoustic delay line may be made of many magnetic materials, some are preferable due to the acoustic wave propagation rate peculiar to the material. Moreover, the material of the delay line need not be magnetic in the usual sense. In this regard, Fig. 6 illustrates a hard rubber or plastic rod 25, in which ferrite or iron filings are molded or otherwise held in suspension. A piezoelectric cell 27 is fixed to one end of the bar 25 and another energy absorber 24 is secured to the other end of the bar 25. When cell 27 is energized, a compression wave is propagated from cell 27 to the absorber 24. In the compression wave there are the regions of compressions and rarefactions which vary in accordance with the modulations of the signal applied to cell 27. The same type of operation occurs when delay line 22 is operated, that is, compression-type waves, regardless of whether they are sonic or supersonic, pass down the delay line to the absorber 24 and the wave itself is made up of compressions and rarefactions.

Figure 2:
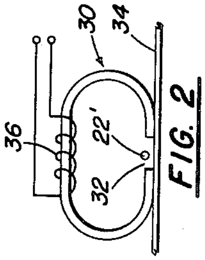
Fig. 2 is a view which schematically illustrates that various kinds of recording may be used in practice of the invention, that is, perpendicular recording may be used as shown in Fig. 1, or a longitudinal recording may be used as in Fig. 2 and, of course, the other, transverse recording, may be adopted if found desirable.
Figure 3:
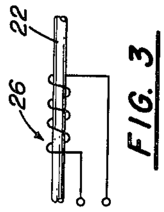
Fig. 3 is a schematic view showing one of the several ways that the acoustic delay line may be driven.

In Fig. 2 the recording head 30 is shaped in the normal way and has a slightly enlarged recording gap 32, adjacent to which the tape 34 passes. The size of gap 32 is exaggerated in this figure for convenience. It accommodates an acoustic delay line 22' identical in construction and function to any of those which are useful in connection with the head of Fig. 1. An energization coil 36 is connected to head 30 and is energized in the same way as coil 18. Delay line 22' is actuated and functions like delay line 22, the operations of which will be described in more detail subsequently.

*Operation*

Figure 4:
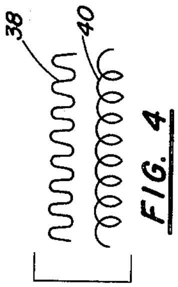
Fig. 4 illustrates two alternative configuration delay lines.

In operation of the described heads, it is to be understood at the outset that magnetic tracks 48 are applied to the tape 20 individually and independently of each other, regardless of the existence of crosstalk. This is in contrast to the continuous recording in a straight line on a tape or other paramagnetic medium. In other words, the heads 10 and 30 apply tracks across the tape in a manner analogous to stamping lines across a tape as a tape transport moves it. It is within the purview and teaching of the invention to have tracks formed across the tape in not only straight line form, but also in other configurations, for example, in a configuration corresponding to the shape of delay line 38 (Fig. 4) or delay line 40. The object in having such shapes is in the reduced necessary width of tape in recording a predetermined amount of signal information.

It is intended that the invention be used for all types of high-speed magnetic recording and play back from tape. One non-exclusive example is a signal in the video range, and therefore, the operation will be described in connection with magnetic recording of television signals. Among other standard parts of a television receiver are the video amplifier and a synchronous pulse separator. A composite viedo signal 41 may be obtained from the ordinary home television receiver at its video amplifier and for recording, applied to driver 26. Although possible, composite signal 41 need not necessarily be applied to driver 26 in its pure state. It may first be amplified or may be used to derive a new signal proportional to the video composite signal for energizing driver 26. For convenience only, it is considered that the video signal 41 is applied directly to driver 26. From the sync separator, the sync signal 42, having the usual pulses 43, is obtained for application to the field energization coil 18. Obviously, instead of deriving a signal 42 from the television receiver sync separator, a signal identical to 42 could have been derived from the composite video signal 41, and applied to the energization coil 18. This is a matter of choice.

The input signal 41 having a proper amplitude for operating the driver 26 is applied thereto as at A. As described heretofore the driver 26 is a transducer operating upon either magnetostriction or piezo electric principles to transform the electrical energy in the input signal 41 into mechanical energy thereby to produce a mechanical movement which corresponds to the wave shape of the electrical input signal. This mechanical movement is applied by the driver 26 to the end of the delay line 22 (or

25) in the conventional manner well known in the electrical computer art so that mechanical pulses corresponding in amplitude to the changes in amplitude of the electrical input signal 41 progress along the delay line as a traveling wave, the peak amplitude portions of the input signal causing relative compression of corresponding areas of the magnetic particles in the delay line whereas the low amplitude portions result in areas of relative expansion of such particles. It will be apparent that the relative compression and expansion of the magnetic particles in the delay as a function of the variations of an input signal cause a corresponding change in the magnetic reluctance of the delay line, its areas of compression having a lower magnetic reluctance whereas its expansion areas have a higher reluctance.

The length and time delay characteristics of the line are selected so as to be correlated with respect to the period of the input signal 41 between the square wave synchronizing pulses so that the portion of the traveling wave in the delay line corresponding to the beginning of the information carrying portion of the signal following one of the synchronizing pulses reaches the point N (Fig. 1) as the traveling wave portion corresponding to the end of the input signal portion immediately preceding the following synchronizing pulse reaches the point M, i.e., one line of the TV signal is entirely set up as an acoustic traveling wave between points M and N on the delay line with corresponding variations in the reluctance of the air gap. The following cynchronizing pulse immediately operates the synchronous pulse separator so that the winding of coil 18 is energized by a pulse, such as 43, applied at B (Fig. 1).

The momentary energization of the coil 18, which encircles the magnetic circuit sets up a flux which passes through the air gap 16, the delay line 22 and the magnetic tape 20. As the air gap is disposed transversely to the direction of movement of the tape, the flux in the air gap establishes a permanent magnetic pattern in the tape which extends crosswise thereof. This magnetic pattern varies as a function of the intensity of its establishing magnetic flux which is in turn controlled by the reluctance of the delay line. It is evident therefore that the transverse magnetic pattern of the tape will vary directly as the amplitude of the information carrying portion of the input signal 41 equivalent to one line of a TV picture frame.

The traveling wave in the delay line progressively decays and is absorbed by the energy absorber 24. The tape 20 is moved by any of the conventional feeding means such as is indicated schematically at 78 to bring an unused cross-section into the air gap. The following information carrying portion of the input signal is then impressed upon the tape in a manner similar to that discussed in detail above so that succeeding frames are recorded as adjacent pattern lines 48 disposed transversely of the tape as shown in Fig. 5.

*Playback*

In general, playback from the tape 20 may be accomplished by reversing the function of driver 26 and coil 18. Of course, this applies to the embodiment of Fig. 2, as does all of the previous discussion in connection with recording. Pulses 43 in signal 42 are applied to driver 26 so that a succession of compression waves travel through the delay line 22. As a single pulse 43 causes a single compression wave to travel along line 22, it moves adjacent to every magnetized region along a track on magnetic tape 20. In the wave, a compressed region of delay line 22 will have less reluctance to the flow of magnetic line of force than a non-compressed or rarified region. Accordingly, a magnetized portion of the tape 20 adjacent to the compressed region in the wave, and hence of delay line 22, will cause a larger number of lines of flux to flow in the magnetic circuit of coil 18, and therefore will be capable of inducing a larger voltage across its terminals. Similarly, extended regions in line 22, caused by the rarified parts of the acoustic wave traveling down the line, will have a greater magnetic reluctance and reduce the magnetic linkage on coil 18 and will cause less voltage to be induced. It is apparent that an acoustic pulse traveling along line 22 will cause a composite signal to be established at the coil 18 which will then constitute pickup terminals in the playback operation. This composite signal can be considered as comprising a voltage induced by the summation of the flux cut by the coil plus a voltage superimposed thereon resulting from the scanning action of the traveling wave. By summation of the flux is meant the total flux that enters the gap as a result of the magnetization of the tape along a transverse area or line such as 48 in Figure 5. When a pulse passes position N of Figure 1, another starts in position M so that as the magnetic tape 20 moves to a new position, a new track is scanned in the described manner.

Instead of using the same head for playback as used in recording, the invention contemplates the system disclosed in Fig. 7. Here, the playback head 60 consists of two cores 62 and 64, disposed close to each other. Core 62 includes a pair of series connected coils 66 and 67, while core 64 includes series connected coils 68 and 69, respectively. In effect, the pickup device 60 consists of two heads having flux gaps 70 and 72, respectively. Acoustic delay line 74 is located in gap 70 and acoustic delay line 76 is disposed in gap 72. The tape 20 is thus adapted to move through identical structures actuated by a standard tape transport schematically indicated at 78. The gap spacing is exaggerated in this figure, it being understood that the elements will be as close together as possible.

In the operation the tape 20 is moved by the tape transport 78 at a uniform, predetermined speed. The acoustic delay line 74 is operated in a manner the same as described for the delay line 22 in connection with playback. However, the acoustic delay line 76 has no acoustic waves traveling down it. Therefore, the total magnetic flux entering the magnetic circuit of the core 64 is made up of the summation of flux originating substantially along the magnetized portions of a single track on tape 20 parallel to the line 76. As the tape 20 moves this total flux will change in accordance with the total magnetization along the track recording adjacent to the acoustic line 76. A varying voltage is induced in the coils 68 and 69, and in a similar manner a voltage is induced in coils 66 and 67. The time taken for a point on the magnetic tape 20 to move a distance equal to the separation of lines 74 and 76 is preferably equal to the horizontal period or multiples thereof so that a voltage signal on the coils 68 and 69 is followed by a similar signal at that specified period of time later on the coils 66 and 67. However inasmuch as the acoustic line 74 is driven by pulses 43, coils 66 and 67 will have in addition, the horizontal scanning video signal components of the type described in connection with coil 18 for playback in a system of Fig. 1. Therefore, there are two signals on the pairs of coils 66 and 67. One is the integrated line signal and the other is the desired scanning signal.

Utilization of these signals is as follows: signals from coils 68 and 69 are supplied to an amplifier 77 and then preferably to a delay means 80. This delay means may consist of an electrical delay line and is so proportioned that it will delay signals by the interval of time taken for the tape 20 to move a distance equal to the separation of acoustic delay lines 74 and 76. At the same time signals from the coils 66 and 67 are applied to an amplifier 82 and the outputs of amplifier 82 and delay means 80 are applied to a difference amplifier 84 which subtracts the corresponding voltages and applies the results to the lead 86. The latter contains the desired scanning signal, since the unwanted pickup signal from coils 68 and 69 after delay, is matched by an identical signal component from coils 66 and 67. After subtraction the identical components cancel, leaving the composite video signal at lead 86 which is easily applied to the video amplifier (Fig. 1) of an ordinary television receiver.

It is understood that various modifications may be made without departing from the following claims.

What is claimed is:

1. A transducer for recording the variations of an input signal in the magnetic field pattern of a recording medium comprising a magnetic circuit having an air gap therein positioned adjacent the recording medium so that the recording medium is within the field of the lines of flux in the air gap, a delay line of a magnetic material disposed transversely of the air gap, means for impressing the input signal upon the delay line to change the magnetic properties therealong as a function of the variations of the input signal thereby causing corresponding magnetic reluctance variations transversely along the air gap, and means associated with the magnetic circuit for subsequently setting up a magnetic flux therein whereby the variations in reluctance of the air gap are established in the magnetic field pattern of the recording medium.

2. A transducer for recording the variations of an input signal in the magnetic field pattern of a recording medium comprising a magnetic circuit having an air gap therein positioned adjacent the recording medium so that the recording medium is within the field of the lines of flux in the air gap, at least one transverse dimension of the air gap normal to flux lines therein being materially greater than the length of the air gap in the direction of the flux lines, an elongated delay line of a magnetic material disposed transversely of the air gap normally to the lines of flux therein, means for impressing the input signal upon the delay line to change the magnetic properties therealong as a function of the variations of the input signal thereby causing corresponding magnetic reluctance variations transversely along the air gap, and means associated with the magnetic circuit for subsequently setting up a magnetic flux therein whereby the variations in reluctance of the air gap are established in the magnetic field pattern of the recording medium.

3. A transducer for recording the variations of an input signal in the magnetic field pattern of a recording medium comprising a magnetic circuit having an air gap therein positioned adjacent the recording medium so that the recording medium is within the field of the lines of flux in the air gap, a delay line including an elongated member of magnetic material disposed transversely of the air gap normally to the lines of flux therein, a driver for compressing and expanding discrete areas of the member disposed lengthwise thereof as a function of the variations of the input signal correspondingly to change the magnetic properties therealong and causing corresponding magnetic reluctance variations transversely along the air gap, and means associated with the magnetic circuit for subsequently setting up a magnetic flux therein whereby the variations in reluctance of the air gap are established in the magnetic field pattern of the recording medium.

4. A transducer for transversely recording the variations of an input signal in the field pattern of a magnetic tape comprising a magnetic circuit having an air gap therein positioned adjacent the magnetic tape so that the tape is within the field of the lines of flux in the air gap, an elongated delay line of a magnetic material positioned in the air gap with its longitudinal axis disposed transversely of the tape, means for impressing the input signal upon the delay line to change the magnetic properties therealong as a function of the variations of the input signal thereby causing corresponding reluctance variations transversely along the air gap, and means associated with the magnetic circuit for subsequently setting up a magnetic flux therein whereby the variations in reluctance of the air gap are established in a magnetic field pattern transversely of the tape.

5. A transducer for transversely recording the variations of an input signal in the field pattern of a magnetic tape comprising a magnetic circuit having an air gap therein the faces of which are positioned adjacent the opposite sides of the magnetic tape so that the tape is within the field of the lines of flux in the air gap, an elongated delay line of a magnetic material positioned in the air gap with its longitudinal axis disposed transversely of the tape, means for impressing the input signal upon the delay line to change the magnetic properties therealong as a function of the variations of the input signal thereby causing corresponding reluctance variations transversely along the air gap, and means associated with the magnetic circuit for subsequently setting up a magnetic flux therein which flux passes through the tape whereby the variations in reluctance of the air gap are established in a magnetic field pattern transversely of the tape.

6. A transducer for transversely recording the variations of an input signal in the field pattern of a magnetic tape comprising a magnetic circuit having an air gap therein positioned adjacent the magnetic tape so that the tape is within the field of the lines of flux in the air gap, means for moving the tape lengthwise past the air gap, an elongated delay line of a magnetic material positioned in the air gap with its longitudinal axis disposed transversely of the tape, means for impressing the input signal upon the delay line to change the magnetic properties therealong as a function of the variations of the input signal thereby causing corresponding reluctance variations transversely along the air gap, and means associated with the magnetic circuit for subsequently setting up a magnetic flux therein whereby the variations in reluctance of the air gap are established in a magnetic field pattern transversely of the direction of movement of the tape.

7. A transducer for transversely recording the variations of an input signal in the field pattern of a magnetic tape comprising a magnetic circuit having an air gap therein positioned adjacent the magnetic tape so that the tape is within the field of the lines of flux in the air gap, means for moving the tape lengthwise past the air gap, an elongated delay line of a magnetic material positioned in the air gap with its longitudinal axis disposed transversely of the tape, driver means for compressing and expanding discrete areas of the delay line disposed lengthwise thereof as a function of the variations of the input signal correspondingly to change the magnetic properties therealong, and causing corresponding magnetic reluctance variations transversely along the air gap, and means associated with the magnetic circuit for subsequently setting up a magnetic flux therein whereby the variations in reluctance of the air gap are established in a magnetic field pattern transversely of the direction of movement of the tape.

8. A system for transversely recording in the field pattern of a magnetic tape the variations of an input signal such as a TV picture signal having information carrying portions interposed between periodically reoccurring synchronizing pulses comprising a transducer including a magnetic circuit having an air gap therein positioned adjacent the magnetic tape so that the tape is within the field of the lines of flux in the air gap, means for moving the tape lengthwise past the air gap, an elongated delay line of a magnetic material positioned in the air gap with its longitudinal axis disposed transversely of the tape, means for impressing the input signal upon the delay line to change the magnetic properties therealong as a function of the variations of one information carrying portion of the input signal thereby causing corresponding reluctance variations transversely along the air gap, and means associated with the magnetic circuit energized in response to the occurrence of the succeeding synchronizing pulse for subsequently setting up a magnetic flux therein whereby the variations in reluctance of the air gap are established in a magnetic pattern transversely of the direction of movement of the tape.

9. A system for transversely recording in the field pattern of a magnetic tape the variations of an input signal, such as a TV picture signal having information carrying portions interposed between periodically reoccurring synchronizing pulses, comprising a transducer including a magnetic circuit having an air gap therein positioned adjacent the magnetic tape so that the tape is within the field of the lines of flux in the air gap, means for moving the tape lengthwise past the air gap, an elongated delay line of a magnetic material positioned in the air gap with its longitudinal axis disposed transversely of the tape, driver means for compressing and expanding discrete areas of the delay line disposed lengthwise thereof as a function of the variations of the input signal correspondingly to change the magnetic properties therealong and causing corresponding magnetic reluctance variations transversely along the air gap, and a winding energized in response to the occurrence of the following synchronizing pulse to set up a magnetic flux in the magnetic circuit whereby the variations in reluctance of the air gap are established in a magnetic field pattern transversely of the direction of movement of the tape.

10. A transducer for reproducing an electrical output signal which varies in response to a magnetic field pattern of a recording medium comprising a magnetic circuit having an air gap therein positioned adjacent the recording medium so that the reluctance of magnetic circuit is a function of the magnetic field pattern, a delay line of a magnetic material disposed transversely of the air gap, means for applying an electrical pulse to the delay line which pulse travels lengthwise thereof to cause a transverse progressive momentary change in reluctance of the air gap so that the intensity of the magnetic flux in the magnetic circuit varies as a function of the field pattern of the recording medium, and a winding linked with the magnetic circuit so that variations in its magnetic flux result in an output signal voltage having corresponding variations in amplitude.

11. A transducer for reproducing an electrical output signal which varies in response to a magnetic field pattern of a recording medium comprising a magnetic circuit having an air gap therein positioned adjacent the recording medium so that the reluctance of magnetic circuit is a function of the magnetic field pattern, a delay line including an elongated member of a magnetic material positioned in the air gap normally to the direction of the lines of flux therein, driver means for applying an electrical pulse to the delay line member which pulse travels lengthwise thereof to cause a transverse progressive momentary change in reluctance of the air gap so that the intensity of the magnetic flux in the magnetic circuit varies as a function of the field pattern of the recording medium, and a winding linked with the magnetic circuit so that variations in its magnetic flux result in an output signal voltage having corresponding variations in amplitude.

12. A transducer for reproducing an electrical output signal which varies in response to a magnetic field pattern of a recording tape comprising two substantially identical magnetic circuits symmetrically arranged with respect to each other and having respective air gaps positioned in spaced relationship adjacent the recording tape so that the reluctance of the respective magnetic circuits varies as a function of the variations of the magnetic field pattern, means for moving the tape lengthwise successively past the air gaps, delay lines of a magnetic material disposed transversely of the respective air gaps, driver means for applying an electrical pulse to one of the delay lines which pulse travels lengthwise thereof to cause a transverse progressive momentary change in reluctance of the air gap so that the intensity of the magnetic flux in the associated magnetic circuit varies as a function of the field pattern of the adjacent portion of the recording tape, two output windings whose turns are linked respectively with the magnetic circuits, and circuit means for connecting the turns of the respective windings in opposed relationship so that variations in the magnetic flux of the magnetic circuit associated with the driver means result in an output signal voltage having corresponding variations in amplitude.

13. A system for reproducing an electrical output signal which varies in response to a magnetic field pattern of a recording tape comprising a transducer including two substantially identical magnetic circuits symmetrically arranged with respect to each other and having respective air gaps positioned in spaced relationship adjacent the recording tape so that the reluctance of the respective magnetic circuits varies as a function of the variations of the magnetic field pattern of the tape, means for moving the tape lengthwise successively past the air gaps, delay lines of a magnetic material disposed transversely of the respective air gaps, driver means for applying an electric pulse to the delay line in the second air gap past which the tape moves to cause a transverse progressive momentary change in the reluctance of the second air gap so that the intensity of the magnetic flux in the associated magnetic circuit varies as a function of the field pattern of the adjacent portion of the recording tape, two output windings whose turns are linked respectively with the magnetic circuits, a difference amplifier having input circuits connecting with the turns of the respective output windings, and a time delay circuit interposed in the amplifier input circuit connecting with the output winding of the magnetic circuit other than the one having the delay line with which the driver means is associated, the period of the time delay circuit being equal to an integral multiple of the elapsed time required for the tape to move between the air gaps so that the identical outputs of the windings are cancelled and the amplifier output is a function of the variations in the reluctance of the second delay line due to the input impressed thereupon by the associated driving means.

References Cited in the file of this patent

UNITED STATES PATENTS

| | | |
|---|---|---|
| 720,621 | Rosenbaum | Feb. 17, 1903 |
| 1,156,976 | Clement | Oct. 19, 1915 |
| 2,170,751 | Gabrilovitch | Aug. 22, 1939 |
| 2,467,202 | Gardiner | Apr. 12, 1949 |
| 2,641,656 | Dicke | June 9, 1953 |
| 2,698,875 | Greenwood | Jan. 4, 1955 |
| 2,739,865 | Willey | Mar. 27, 1956 |
| 2,762,861 | Somers | Sept. 11, 1956 |